Patented Mar. 26, 1929.

1,706,564

UNITED STATES PATENT OFFICE.

BAYLIS M. DAWSON, OF BROOKLYN, NEW YORK, ASSIGNOR TO THE FLEISCHMANN COMPANY, OF NEW YORK, N. Y., A CORPORATION OF OHIO.

YEAST COMPOSITION AND METHOD OF PREPARING THE SAME.

No Drawing.  Application filed June 30, 1922. Serial No. 572,067.

My invention relates to the manufacture of dried yeast compositions and more particularly to the preparation of relatively dry compositions containing yeast together with substances which possess a nutritive value as a food for man or animal or as a food for the yeast-organisms with which they are associated, and in the revitalization of which, for example in preparing bread dough, they have a favorable influence. Still more particularly, my invention relates to certain improved and novel dried yeast compositions and to a method of preparing the same, as fully set forth in the following description and as defined in the claims.

The substance or substances preferably associated with the yeast in accordance with my present invention are also of such a character that they have the advantage of serving as a protective medium for the yeast cells during the drying operation to which the mixture is subjected in accordance with my process as hereinafter described and also possesses useful functions in the subsequent employment of my dried yeast composition. Heretofore in attempting to prepare durable products containing viable yeast cells the yeast has been dried usually after preliminary mixture with moisture absorbing substances such as cornmeal which together with the yeast and a requisite quantity of water has been customarily formed into small fragments or blocks and dried by the action of heat. In preparing dried yeast mixtures in accordance with such previously customary methods a very large proportion of the yeast cells are likely to be killed as an incident of the drying operation and the products thus prepared after a short time are often composed largely of inactive or dead yeast cells associated with the substantially inert absorbing material which was mixed with the yeast preliminary to the drying operation.

The difficulty is also encountered in connection with drying yeast in accordance with heretofore known methods of the type referred to that either an unduly high temperature is required which is especially deleterious to the life of the yeast or a very prolonged drying operation at a low temperature has been required which renders the process very tedious and in commercial practice requires the installation of a large drying plant. In accordance with my present process the yeast is preferably dried quickly and at such a low temperature and under such conditions as to preserve an unusually large proportion of the yeast cells in a live and active condition. In a suitable embodiment of my invention 5 pounds of compressed baker's yeast of good quality (preferably differing from the well-known compressed baker's yeast of commerce only in the fact that it contains no starch or similar amylaceous mixture) and containing about 70–75% total water is mixed with a sufficient quantity of a suitable liquid such as fresh whole milk 3 quarts as to form a fluent readily atomizable mixture. The use of milk with the yeast, possesses, as I have discovered, certain definite advantages, in carrying out my invention, hereinafter referred to, but, as also pointed out hereinafter, it is possible, in certain instances and for certain purposes in my novel process, to use other substances instead of milk, without departing from the invention in its generic aspect. This mixture is then atomized or sprayed in the form of a finely subdivided mist into a chamber through which air or other innocous gas is passed at a suitable temperature and humidity to effect evaporation of a large proportion of the water from the particles of the atomized mixture.

In carrying out this process an apparatus of the general type disclosed in U. S. Patent No. 1,090,740 to Wharton B. McLaughlin, issued March 17, 1914, may be suitably employed, although my invention is not limited to the employment of this particular type of apparatus nor to the particular method of operating described in said patent. In drying the yeast mixture I have also found that good results are obtained by atomizing the yeast mixture horizontally into the upper portion of a rectangular drying chamber about 4 ft. by 7½ ft. in cross section and 8 ft. high or preferably higher into which is also passed a current of air or other drying gas entering near the top of the chamber and preferably opposite to the point of entry of the yeast mixture, such current of air or other gas suitably entering through a long narrow horizontal slot and having a temperature at the point of entry of 45–100° C. Near the bottom of the drying chamber and suitably upon the same side of the chamber as that into which the yeast mixture is atomized an outlet is provided for the air or other gas which has been used in the desiccation and if desired there may be provided near the bottom of the drying chamber and suitably at a location approximately opposite to the outlet opening just mentioned an inlet opening for auxiliary air or other drying gas which may suitably be introduced at a temperature of about 35° C. or somewhat higher and which may serve to facilitate the desired desiccation of the particles of the yeast mixture as they fall through the drying chamber.

Preferably below the level of the outlet opening and opening for auxiliary desiccating gas there is provided a hopper or other suitable device for collecting the dried particles which gravitate from the upper portion of the chamber. In carrying out the process of my present invention I have found that certain substances which are present in whole milk serve as protective colloids which surround the yeast cells and serve to regulate the desiccation of the mixture so that it proceeds without such damage to the vitality of the yeast cells as almost invariably has occurred in heretofore known yeast drying processes. As protective agents in the drying of yeast in accordance with my invention and especially in the drying of a yeast mixture as described by atomization in contact with a current of suitable desiccating gas other protective substances may be used instead of whole milk, for example skim milk or a dilute aqueous solution (e. g., a 0.5% solution) of so-called vegetable gelatin (agar agar), either of which may be used in the proportion of 1 pint for each pound of compressed yeast. The use of milk, however, and particularly the use of fresh whole milk as described has the especial advantage that the desiccated product has a high nutritive value and is rich in vitamines and other substances which render it eminently suitable either as a food ingredient or consumption by man or animals or as a preparation adapted for use in preparing bread or similar food products in which the yeast may function as a leavening agent assisted in this function by its intimate association with the yeast nutrient constituents (including milk sugar and certain inorganic salts) which are present in the milk. When such a product is used, for example in preparing bread, such substances associated with the yeast as are not utilized by the yeast cells in their activity as leavening agents will also remain in the bread or other similar food products formed and will augment its nutrient value.

A composition as prepared in accordance with my invention and which may consist exclusively or mainly of yeast and a substance such as desiccated milk is among other uses well adapted for the compounding of vitamine-containing preparations such for example as beverages prepared by the addition of water (which may or may not be carbonated) with or without other flavoring substances or nutrient materials. To facilitate the compounding of such preparations the mixture of yeast and milk or other substances may for convenience be formed into tablets one or more of which may be readily disintegrated in liquid because of the ready solubility of the substance associated with the yeast.

If it is desired merely to expeditiously obtain a comminuted dried yeast, ordinary compressed yeast may if desired be merely mixed with from slightly less than an equal weight of water up to about twice its weight of water to form a fluid mixture of desired atomizable consistency, and this mixture may then be subjected to spray desiccation such as hereinabove described, but such a process will lack the several advantages which I have discovered reside in the use of a nutritive and protective substance of the character of milk and such a nutritive and protective substance is as previously described preferably used with the yeast in accordance with the process of my invention.

A mixture of high nutritive value and which is rich in vitamines may also be prepared by the spray desiccation in accordance with my invention of a mixture containing yeast, whole milk or skim milk and malt extract. Suitable mixtures may, for example, be formed of yeast 5 pounds, skim milk 4 pints and a malt extract (of high diastatic strength and containing about 80% solids) 5 pints. Or, yeast 3 pounds, skim milk 20 pounds and a malt extract of similar character 2 pounds. In the latter formula whole milk may with advantage be used instead of skim milk, and a composition thus prepared from yeast 3 pounds, malt extract 2 pounds and whole milk 20 pounds is especially suitable as a material for use in bread making.

In drying mixtures of the character described in accordance with my invention the liquid mixture may be atomized at ordinary room temperature into a drying chamber to which air is supplied at temperatures up to 100° C. or even slightly higher in which case the flow of air should be so regulated that the temperature in the initial drying zone will, however, ordinarily not exceed about 45° C. (safely below a temperature lethal to yeast) and so that lower temperatures will prevail in the zones of the drying chamber containing the partially dried particles of the yeast or yeast mixture. However, for the purpose of avoiding undue heating of the yeast and of preserving the viability of the largest possible proportion of yeast cells it may be advantageous to limit the highest temperature of the air entering the drying chamber to 45° C.–100° C. in which instance the temperature of this air may be reduced to 30° to 45° C. in the initial drying zone by the evaporation there taking place. In the latter instance an auxiliary supply of air may be introduced at a temperature of about 35° C. or slightly higher so that it will come into contact with the partially dried yeast or yeast mixture and may slightly increase its temperature for the purpose of final evaporation of moisture from the particles before the yeast enters the collecting hopper or other receptacle wherein it is recovered. I have found that the presence of substances such as milk which exercise a protective influence upon the yeast cells permits (without killing the yeast) the employment of air at a higher temperature for the purpose of desiccation than when such protective substances are not present and the use of this protective substance therefore has the further advantage, by permitting the use of higher temperatures for desiccation, of expediting the process and enabling a given quantity of yeast or yeast mixture to be dried with a small equipment and in a short time.

In order not to destroy the diastatic properties possessed by mixtures containing malt extracts prepared in accordance with my invention the drying temperature employed for such mixtures should be below that which is, under the prevailing conditions, destructive or lethal to the diastatic enzymes present. For this purpose the temperatures employed may be limited to the same extent as for the purpose of preserving the viability of the yeast to the greatest possible degree, although as is well known diastatic enzymes of malt extract are capable of withstanding temperatures up to about 60° C. or slightly higher for short periods.

If it be desired to avoid any possibility of enzymic or other reactions taking place between the constituents of the substances undergoing desiccation in the case of any of the hereinbefore described mixtures, the substances such as the yeast and milk with or without malt extract may be mixed together either immediately before atomization or at the point of atomization into the drying chamber so that substantially no lapse of time is permitted for reactions to take place before drying. The drying of the described mixtures of course renders the substances present in the products substantially non-reactive toward each other until they are desired for use at which time the mixture becomes moistened.

In the claims where non-lethal temperature is referred to it will be understood that this refers to a temperature below that which would kill the yeast and such temperatures, examples of which are above given, will also, as will be apparent from the description, have no permanent harmful effects upon diastatic enzymes which may be present in the mixture undergoing desiccation.

What I claim is:

1. A comminuted and substantially dry composition consisting essentially of yeast particles substantially encapsulated in milk solids.

2. A comminuted and substantially dry composition consisting essentially of viable yeast particles substantially encapsulated in milk solids.

3. A comminuted and substantially dry composition consisting essentially of yeast and of conjointly desiccated whole cow's milk.

4. A comminuted and substantially dry composition consisting essentially of viable yeast and of conjointly desiccated whole cow's milk.

5. A substantially dry composition comprising essentially yeast substantially encapsulated in milk solids.

6. A substantially dry composition comprising essentially finely subdivided particles of yeast encapsulated in milk solids.

7. A substantially dry food composition comprising essentially yeast, encapsulated by milk solids and by the solids of malt extract.

8. A comminuted and substantially dry composition consisting essentially of yeast encapsulated in and associated with milk solids and the solids of a malt extract.

9. A substantially dry food composition comprising essentially yeast, encapsulated by milk solids and the solids of malt extract containing diastatic enzymes.

10. The method of desiccating substances comprising yeast, milk and diastatic malt extract which react upon each other by prolonged contact which comprises mixing such substances in liquid condition substantially coincident with their atomization, atomizing such substances together into an aeroform fluid of such non-lethal temperature and volume as to evaporate moisture from the atomized material and to reduce its particles to a substantially dry condition such that the ingredients of the product are substantially non-reactive toward each other and separating the dried particles from the aeroform fluid.

11. The method of desiccating substances comprising yeast, whole milk and diastatic malt extract which react upon each other by prolonged contact which comprises mixing such substances in liquid condition substantially coincident with their atomization, atomizing such substances together into an aeroform fluid of such non-lethal temperature and volume as to evaporate moisture from the atomized material and to reduce its particles to a substantially dry condition such that the ingredients of the product are substantially non-reactive toward each other and separating the dried particles from the aeroform fluid.

In witness whereof, I have hereunto signed my name to this specification on the 27th day of June, 1922.

BAYLIS M. DAWSON.